(12) United States Patent
Mathiske et al.

(10) Patent No.: US 7,925,640 B2
(45) Date of Patent: Apr. 12, 2011

(54) DYNAMIC MULTIPLE INHERITANCE METHOD DISPATCH DATA STRUCTURE INCLUDING AN M-TABLE SIZE, I-TABLE CONTAINING ONE OR MORE HOLDER ADDRESSOR REGIONS AND TYPE EXTENSION TESTING BY FRUGAL PERFECT HASHING

(75) Inventors: Bernd J.W. Mathiske, Sunnyvale, CA (US); Laurent P. Daynes, Saint Ismier (FR); Gregory M. Wright, Mountain View, CA (US)

(73) Assignee: Oracle America, Inc., Redwood Shores, CA (US)

( * ) Notice: Subject to any disclaimer, the term of this patent is extended or adjusted under 35 U.S.C. 154(b) by 337 days.

(21) Appl. No.: 12/031,387

(22) Filed: Feb. 14, 2008

(65) Prior Publication Data
US 2009/0210379 A1    Aug. 20, 2009

(51) Int. Cl.
*G06F 17/00* (2006.01)
*G06F 17/30* (2006.01)
*G06F 9/44* (2006.01)
*G06F 9/26* (2006.01)

(52) U.S. Cl. ........ 707/698; 707/796; 707/802; 707/803; 707/955; 717/116; 717/165; 711/200; 711/209

(58) Field of Classification Search .............. 707/790, 707/791, 793, 796, 800–801, 802, 809–810, 707/696–698, 803, 955, 960; 717/116, 148, 717/153, 151, 108, 165; 719/315–316; 711/108, 711/118, 122, 216, 200, 209
See application file for complete search history.

(56) References Cited

U.S. PATENT DOCUMENTS 5,327,562 A * 7/1994 Adcock .................... 717/141
5,542,087 A * 7/1996 Neimat et al. .............. 1/1
(Continued)

FOREIGN PATENT DOCUMENTS

WO    WO 97/18512    *    5/1997
(Continued)

OTHER PUBLICATIONS

Kumar Ashish et al. "Message dispatch: data structure and algorithms", object oriented systems (implementation) 2007, 19 pages.*
(Continued)

*Primary Examiner* — Srirama Channavajjala
(74) *Attorney, Agent, or Firm* — Park, Vaughan, Fleming & Dowler LLP

(57) ABSTRACT

In the described embodiments, a computer constructs a dispatch data structure for a holder by first determining a set of member holders from which the holder inherits. The computer then constructs an "i-table" that includes holder addressor regions that each contains addressors for an associated set of members. Each of the holder addressor regions is associated with an i-table index. The computer next collects a set of identification numbers for the set of member holders and, from these, constructs an "m-table." The size of the m-table is selected to perfectly hash the set of identification numbers by the m-table size. The computer then computes an m-table index for each of the set of identification numbers modulo the m-table size and uses the m-table index to populate the m-table. The computer next stores the i-table index in the m-table in accordance with the m-table index.

19 Claims, 7 Drawing Sheets

U.S. PATENT DOCUMENTS

| | | | | |
|---|---|---|---|---|
| 5,815,689 A | * | 9/1998 | Shaw et al. | 713/400 |
| 5,848,423 A | * | 12/1998 | Ebrahim et al. | 1/1 |
| 5,875,461 A | * | 2/1999 | Lindholm | 711/118 |
| 5,907,707 A | * | 5/1999 | Ramalingam et al. | 717/104 |
| 5,920,900 A | * | 7/1999 | Poole et al. | 711/216 |
| 5,950,221 A | * | 9/1999 | Draves et al. | 711/100 |
| 5,960,197 A | * | 9/1999 | Segnan | 717/116 |
| 5,987,529 A | * | 11/1999 | Nakamura et al. | 719/328 |
| 6,256,752 B1 | * | 7/2001 | Blandy et al. | 714/38 |
| 6,275,919 B1 | * | 8/2001 | Johnson | 711/216 |
| 6,516,320 B1 | * | 2/2003 | Odom et al. | 707/747 |
| 6,658,556 B1 | * | 12/2003 | Arimilli et al. | 712/225 |
| 6,862,728 B2 | * | 3/2005 | Darnell et al. | 717/148 |
| 6,944,637 B2 | | 9/2005 | Darnell | 1/1 |
| 7,100,015 B1 | * | 8/2006 | Mathiske et al. | 711/170 |
| 7,321,909 B1 | * | 1/2008 | Garthwaite | 1/1 |
| 7,353,499 B2 | * | 4/2008 | de Jong | 717/127 |
| 7,574,705 B2 | * | 8/2009 | Taivalsaari et al. | 717/162 |
| 2002/0032719 A1 | * | 3/2002 | Thomas et al. | 709/107 |
| 2002/0049865 A1 | * | 4/2002 | Charnell et al. | 709/315 |

FOREIGN PATENT DOCUMENTS

| | | | |
|---|---|---|---|
| WO | WO 01/33346 | * | 5/2001 |
| WO | WO 01/35214 | * | 5/2001 |
| WO | WO 01/57656 | * | 8/2001 |
| WO | WO 03/081461 | * | 10/2003 |
| WO | WO 2005/074555 | * | 8/2005 |

OTHER PUBLICATIONS

Christian Queinnec, "Fast and compact dispatching for dynamic object-oriented languages",Information Processing Letters 64 (1997) 315-321.*

Dong Li et al. "Quadtree and Hash Table Based Index Structure for Indexing the Past, Present and Future Positions of Moving Objects", International Symposium on Computer Science and its Applications, IEEE, 2008, pp. 17-21.*

Click, Cliff et al., Fast Subtype checking in the HotSpot JVM, JGI'02, Nov. 3-5, 2002, Seattle Washington, downloaded Feb. 29, 2008, http://www.google.com/search?q=cache:2-ob7EpLiPYJ:www.cs.ucsb.edu/~ckrintz/papers/ifaceimpl.ps+Efficient+Implementation+of+Java+Interfaces:+Invokeinterface+Considered+Harmless&hl=en&ct=clnk&cd=1&gl=us, pp. 96-103.

Alpern, Bowen et al., Efficient Implementation of Java Interfaces: Invokeinterface Considered Harmless, IBM T.J. Watson Research Center, P.O. Box 704, Yorktown Heights, NY 10598, OOPSLA 2001 Tampa Florida USA, Copyright ACM 2001 1-58113-335-9/01/10, pp. 108-124.

Vitek, Jan et al., Compact Dispatch Tables for Dynamically Typed Object Oriented Languages, DoCIS Documents in Computing and Information Science, Compiler Construction 1996, pp. 309-325.

* cited by examiner

DYNAMIC MULTIPLE INHERITANCE
METHOD DISPATCH DATA STRUCTURE
INCLUDING AN M-TABLE SIZE, I-TABLE
CONTAINING ONE OR MORE HOLDER
ADDRESSOR REGIONS AND TYPE
EXTENSION TESTING BY FRUGAL
PERFECT HASHING

BACKGROUND

1. Technical Field

The disclosed technology relates to the field of object-oriented compiler and run-time optimizations.

2. Background Art

Virtual dispatch in a single inheritance Object-Oriented-Programming (OOP) Runtime can be handled using the well-known v-table dispatch technique. However, Object Oriented Programming Runtimes that support multiple inheritance or a similar capability (such as the interface capability of the Java® programming environment) are more complex due to the conflicting name spaces for the members (such as class fields and/or methods) in the superclasses for a class C (the well-known diamond problem). The simplest solution is a quadratic table of all member holders in the system. However, these tables are subject to quadratic growth and are sparsely populated because most member holders are classes that inherit from very few member holders. A member holder can be, for example, a class/interface/type that contains members such as methods and/or fields. In the descriptions herein, specific references to classes, methods, fields, etc. are intended to serve as illustrations for the general case of members in holders. For example, a subclass of a superclass can have added members over the superclass. These added members in the subclass comprise the contribution for the subclass.

The problem is how to implement the following queries in object-oriented programming languages with multiple inheritance: 1) dynamic interface inheritance testing given multiple interface inheritance; 2) dynamic subclass testing given multiple implementation inheritance; 3) interface method invocation selection dispatch given multiple interface inheritance; and 4) method invocation selection dispatch given multiple implementation inheritance.

There has been significant research in achieving time/space/implementation effort tradeoffs for virtual dispatch. Many of the known techniques marginally improve the time or space aspect, but often with a very significant implementation and debugging effort. The two implementation extremes are: 1) recursive search in the holder hierarchy (excellent space efficiency but very slow); and 2) A quadratic table of size number-of-holders times number-of-potential-holders (provides excellent query speed, but the space requirement is quadratic with the number of holders). There exist many implementations between these extremes.

Extensive research has been documented about different approaches to method dispatch in Object-Oriented programming environments. For example, a comparison of the technology used in the area of dispatch tables with a competitive solution both in terms of space and speed was published in: *Compact Dispatch Tables for Dynamically Typed Object Oriented Languages*, Jan Vitek, R. Nigel Horspool, International Conference on Compiler Construction (CC 1996) and *Efficient Type Inclusion Tests*, Jan Vitek, R. Nigel Horspool, Andreas Krall, Conference on Object Oriented Programming Systems, Languages Applications (OOPSLA'97). These documents may assist one not skilled in the art with understanding the problem addressed by the technology disclosed herein.

For each new OOP languages (such as scripting languages) adding multiple inheritance capability generally requires many person-months or -years to implement and debug the above queries.

It would be advantageous to provide a virtual dispatch technology that is simple to implement yet has a speed/space tradeoff that is appropriate for general use.

DETAILED DESCRIPTION

The technology disclosed herein includes methods for constructing and using a dispatch data structure for a holder (such as a class, type, or interface). The construction method determines a set of member holders from which the holder inherits. One of the set of member holders has a respective set of members. Each of the set of member holders is uniquely identified by its identification number. The construction method constructs an i-table that contains one or more holder addressor regions. One of the one or more holder addressor regions contains addressors for the respective set of members. Each of the one or more holder addressor regions is associated with a respective i-table index. The method collects a respective set of identification numbers for the set of member holders and constructs an m-table. The m-table has an m-table size that is selected to perfectly hash the respective set of identification numbers by the m-table size. Once the m-table is constructed, the method populates the m-table with the respective i-table index for each of the set of member holders, by computing an m-table index responsive to each of the respective set of identification numbers modulo the m-table size and storing the respective i-table index in the m-table respective to the m-table index.

The usage method for a holder, that has a dispatch data structure that includes an m-table and an i-table where the m-table has an m-table size and the i-table containing one or more holder addressor regions, determines an m-table index into the m-table by accessing an identification number of a holder of interest and computing the identification number modulo the m-table size. The method accesses an i-table index from the m-table responsive to the m-table index. the i-table index locates one of the one or more holder addressor regions in the i-table. The method can then dispatch relative to the one of the one or more holder addressor regions.

The disclosed technology also teaches apparatus and program products that use the methods as well as a memory that contains the disclosed data structures.

Figure 1:
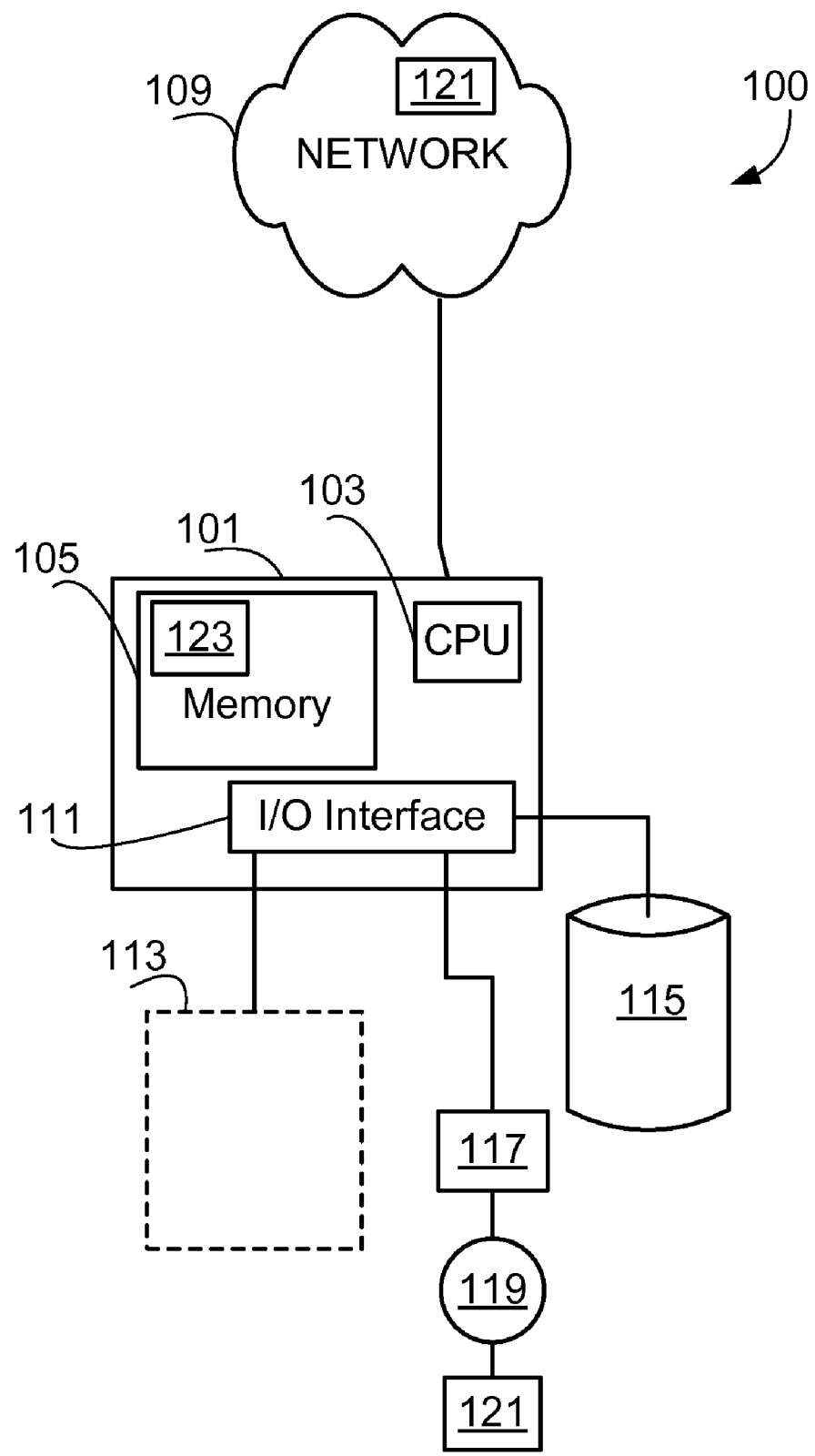
FIG. 1 illustrates an example computer system that can use the disclosed technology.

FIG. 1 illustrates a computer system 100 that can incorporate the disclosed technology. The computer system 100 includes a computer 101 that incorporates a CPU 103, a memory 105 (that can hold the generated data structures) and that can have access to a network 109. The computer 101 also includes an I/O interface 111 that can be connected to a user interface device(s) 113, a storage system 115, and a removable data device 117. The removable data device 117 can read a computer-usable data carrier 119 (such as a fixed or replaceable ROM within the removable data device 117 itself (not shown); as well as a computer-usable data carrier that can be inserted into the removable data device 117 itself (such as a memory stick, CD, floppy, DVD or any other tangible media) that typically contains a program product 121. The user interface device(s) 113 can include display and user input devices (not shown—illustrative examples include a keyboard, keypad, display, voice input/output, video output, etc.). The storage system 115 (along with the removable data device 117), the computer-usable data carrier 119, and (in some cases the network 109) comprise a file storage mechanism. The program product 121 on the computer-usable data carrier 119 is generally read into the memory 105 as a program 123 which instructs the CPU 103 to perform specified operations. In addition, the program product 121 can be provided from devices accessed using the network 109. One skilled in the art will understand that the network propagates information (such as data that defines a computer program). Signals can be propagated using electromagnetic signals, visible or invisible light pulses, signals on a data bus, or signals transmitted over any wire, wireless, or optical fiber technology that allows information to be propagated from one point to another. Programs and data are commonly read from both tangible physical media (such as those listed above) and from the network 109. Thus, the network 109, like a tangible physical media, can be a computer-usable data carrier. One skilled in the art will understand that not all of the displayed features of the computer 101 need to be present for all embodiments that implement the techniques disclosed herein. Further, one skilled in the art will understand that computers are ubiquitous within modern devices ranging from as cell phones to vehicles to kitchen appliances etc. Such a one will also understand that the program product 121 can include an Object-Oriented runtime that can use the disclosed technology herein.

Many OOP runtime systems provide for two level dispatch: cache-based and table-based. In these cases, the runtime first looks in the cache to determine if the addressor for the member has already been determined and if so, uses that addressor. If the addressor for the member has not been determined, a table-based technique is used to determine the addressor for the member that is then added to the cache. The thrust of the technology described herein is toward non-cached dispatch or the table-based aspect of a two level dispatch.

One skilled in the art will understand the use of the term "size" as related to the described data structures. When used in the data structure context, the term generally means the number of elements in the structure as compared to the number of bytes in memory needed to store the structure.

Figure 2:
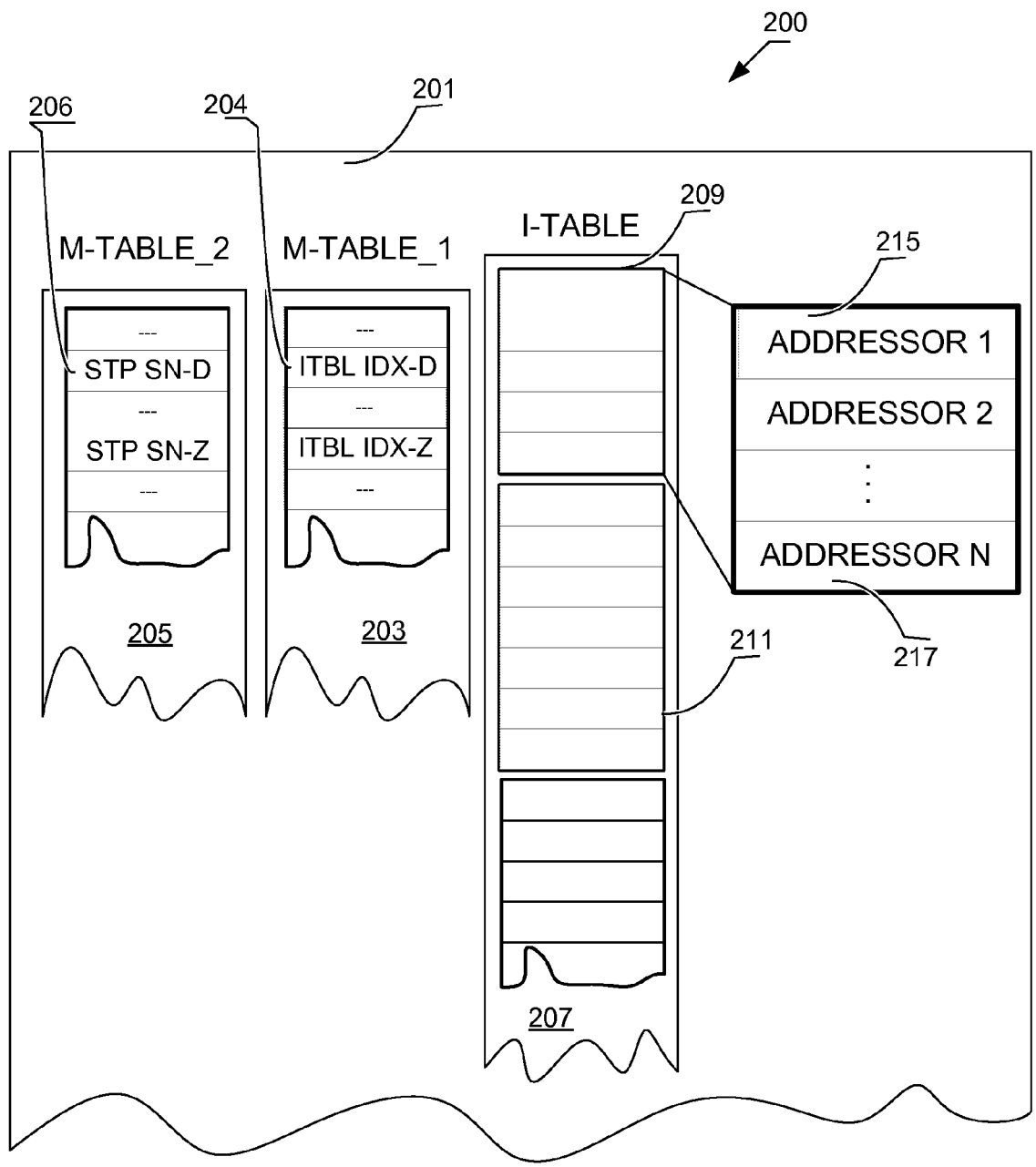
FIG. 2 illustrates a first dispatch data structure.

FIG. 2 illustrates a holder structure 200 that includes a dispatch data structure 201. In this version of the disclosed technology, the dispatch data structure 201 contains a first m-table 203 containing an i-table index element 204, a second m-table 205 that contains a holder identification number element 206, an i-table 207 that can be densely packed with one or more holder addressor region(s) such as a first holder addressor region 209 and a second holder addressor region 211 through $m^{th}$ holder addressor region (not shown). The holder addressor regions can be of different sizes and provide access through the addressors to the members of a given one of the holder structure 200's inherited supermember holder(s). The first holder addressor region 209 includes a first member addressor element 215 through an $n^{th}$ member addressor element 217. The addressors can be addresses of, or indirect pointers, handles, indexes, etc. to members for the supermember holder referenced by the first holder addressor region 209.

The first m-table 203 and the second m-table 205 are perfect hash tables of the identification number(s) used to construct the dispatch data structure 201. One skilled in the art will understand that a perfect hash table is one that, while it may have empty elements, has no collisions with the hashed values. In the version shown in FIG. 2, both the first m-table 203 and the second m-table 205 are the same size. They are perfect hashes of the identification number of the supermember holder(s) used to define the dispatch data structure 201 with the size of the m-table. Thus, as is subsequently described with respect to FIG. 5 and FIG. 6, an object can determine whether its inherits from T by hashing T's identification number by the length of the second m-table 205, indexing into the second m-table 205 by the hash, and determining whether the value in that element is equal to T's identification number. Thus, if T's identification number hashes to the holder identification number element 206, and if "STP SN-D" represents a number that is the same as T's identification number, then T is a supermember holder of holder represented by the holder structure 200; but if "STP SN-D" is empty or some number other than T's identification number, T is not a supermember holder of the holder represented by the holder structure 200. The same hash of T's identification number can be used to index into the first m-table 203 and the second m-table 205.

While the first m-table 203 and the second m-table 205 are loosely packed, the i-table 207 is a table of addressors for members that can be used to: send a message to or access a supermember holder member. The addressors in the i-table 207 are arranged by supermember holder such that the addressors for a given supermember holder are in a holder addressor region. The first m-table 203 contains indexes into the i-table 207 for the holder addressor region belonging to each inherited supermember holder. Once T is determined to be a supermember holder of the holder (using the previously described process with respect to the second m-table 205) the index into the i-table 207 for the holder addressor region of T can be found by using the same hash (that was used to access the second m-table 205) to retrieve the index (represented by "ITBL IDX-D" in the figures) from the i-table index element 204 and to locate the related holder addressor region for T. Thus, the holder addressor regions can be of differing sizes and the i-table 207 can be densely packed. Accessing a member of a supermember holder can be accomplished respective to the meaning of the addressor (whether a direct address, a pointer, a handle, an index, etc.).

In some versions of the technology, each supermember holder is assigned an identification number that is one more than the identification number of the previously defined supermember holder. The size of the m-tables can be determined by collecting the supermember holder identification numbers for the holder structure 200 and attempting to hash them into a table of a given size; detecting if two of the identification numbers collide and if they do, increasing the size of the putative table and trying again; until a perfect hash is achieved. Other techniques to determine a perfect hash may be known to those in the art (for example, gperf: see GNU gperf—Iterating: Wiki-Based Software Guide, n.d., http://www.iterating.com/products/GNU-gperf#reviews, Date last accessed: Jan. 17, 2008). Because the values in the m-tables are known at compile time, the generated tables are static and need not be subsequently extended.

For the version of the technology shown in FIG. 2 where the identification number of each supermember holder used by holder C is stored in elements of the second m-table 205, a fast subtype test process (testing whether a holder of interest (T) is a parent of holder C) can be performed as:

m-index:=id_num(T) % m-table-size(C)
answer_state=m-table[m-index]==id_num(T)

as is subsequently described with respect to FIG. 5.

After having determined that T is a parent of holder C, a fast member dispatch/access for the $n^{th}$ member declared by T is:

m-index:=id_num(T) % m-table-size(C)
i-base:=m-table[m-index]
i-index=i-base+n
addressor=i-table[i-index]

as is subsequently described with respect to FIG. 7.

One skilled in the art will understand that the term "member" refers to members in the owning holder. Such a one will also understand that the dispatch data structure 201 can include more structure than is described in the text or shown in the various figures herein. Such a one will understand that the i-table 207 contains elements for every member for every superholder of the holder (as well as every member contributed by the owning holder). These member addressors are grouped into holder addressor regions by supermember holder (and the owning holder) and that the offset of each member in its holder addressor region is statically known. Further such a one will understand that the i-table 207 is similar to a v-table, with the difference that the member addressors for different supermember holders can be stored at a different offset in every subholder's i-table (with v-tables, every member has the same v-table index).

Each member holder can be assigned a identification number when defined. In some versions of the disclosed technology, the identification number is sequentially assigned and increases by one for each new assignment. In another version, the identification number increases by some fixed multiple of 1. In yet another version the identification number increases by a small random number for each new member holder definition. Any identification number-assigning process that provides different identification numbers for each holder will work. Depending how densely these identification number are chosen, m-table sizes will remain small. Therefore the densest choice, that is, sequential assignment, must work best on average in the general case where nothing is known in about inheritance relationships when the identification numbers are assigned. If inheritance relationships are known when the identification numbers are assigned, dense tables can be constructed by choosing the identification numbers more cleverly (see the literature on perfect hash tables for known sets of elements or even use brute force trial/error), then the process can fill in the unused identification numbers between the ones used so far, and then move on sequentially into the unknown.

The inventors believe the best mode for assigning the identification number is by increasing the identification number by one for each defined member holder.

When a holder (subclass) is defined that inherits from one or more member holders (supermember holders), the compiler has access to the identification number(s) for the inherited supermember holder(s) at compile time. Thus, the holder and members tables for a particular holder are static at runtime.

The size of the i-table 207 in the holder structure 200 is linear with respect to the number of superholders referenced by the holder structure 200 when the identification numbers are sequentially assigned. The size of the m-table appears to be indeterminate. However, the inventors have performed empirical tests to determine typical m-table sizes. These tests have computed quotients for m-table-sizes relative to the number of "keys" (that is, the identification numbers of the number of actually present supermember holders). These tests show that these quotients react only slowly, and sublinearly, to increases of either the total number of available identification numbers or the number of supermember holders per holder C. For practical Java purposes (thousands of classes with dozens of interfaces) these quotients are about 4 to 10. Thus, the m-table sizes are, on average, only 4-10 times the number of entries in the table. This overhead compares very favorably to the overhead for a typical quadratic space approach and to many in-between approaches. Furthermore, the size of a corresponding quadratic table is the upper limit for the size of the m-table.

The inventors, who have had extensive experience researching and implementing OOP method dispatch technology, did not expect that the sizes of the m-tables to be so manageable. The unexpected result that a simple hash (of the sequentially assigned identification number by the size of the corresponding perfect hash table) generated hash tables of manageable size, and still allowed very efficient member dispatch and subtype test processes was surprising. There exist many more complex approaches to this problem, but none are any more suitable for the speed/memory use tradeoffs for the general-case implementation than the technology described herein, and all of the other approaches are much more complex to implement.

The disclosed technology can be combined with holder caching technology for fast super-holder checking when the programming language uses single inheritance as well as multiple inheritance. Take for instance Java and C# and their interface feature. In such cases, a quick check of the supermember holder at hand is applied. Using the holder caching technology if the supermember holder at hand is a holder a fast holder display lookup is used. However, if the supermember holder at hand is an interface or not in the cache the technology disclosed herein is used. In addition often the supermember holder is known at compile time so that the check and branching can easily be eliminated by the compiler by constant folding and scarce conditional elimination (dead code elimination).

Figure 3:
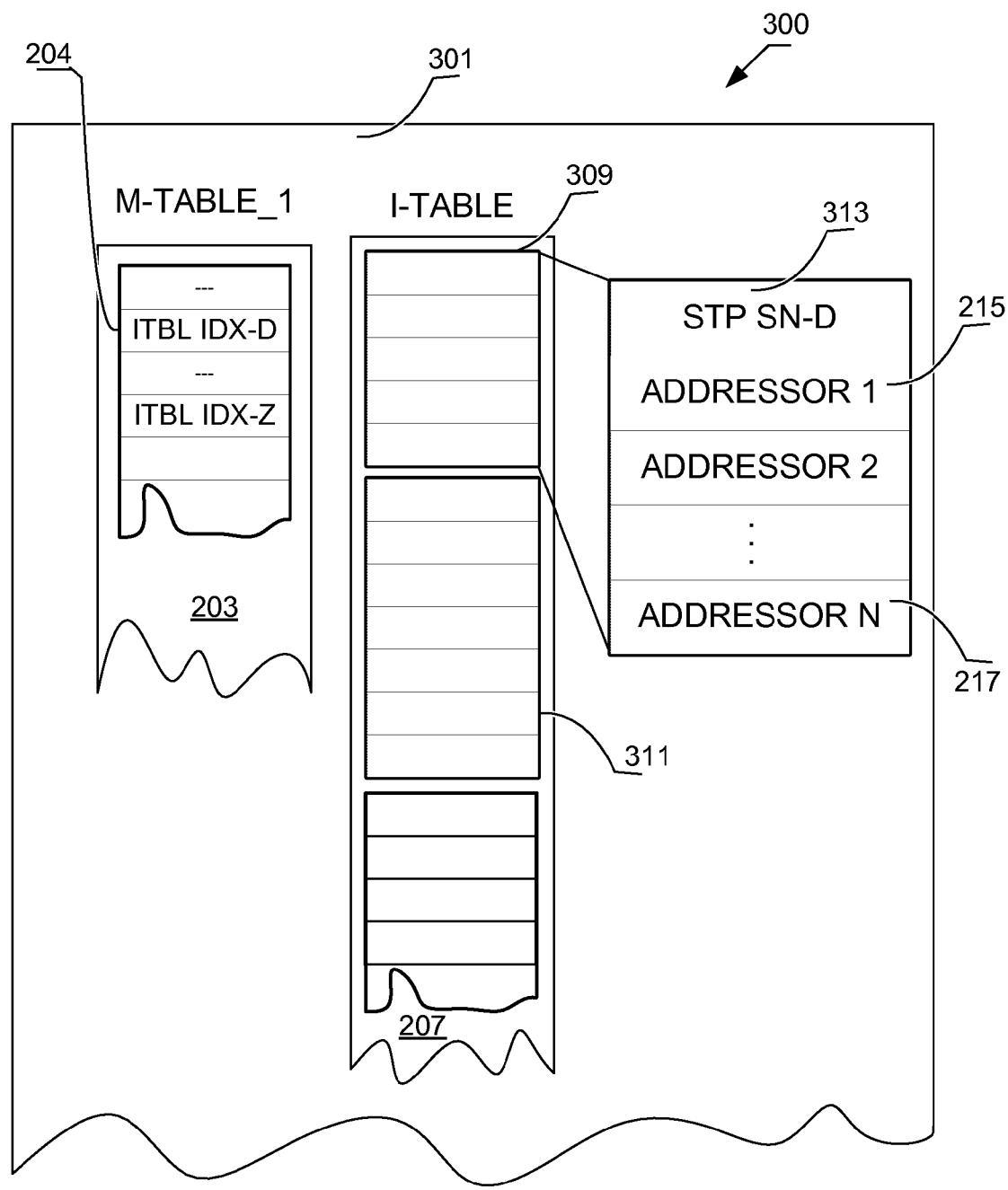
FIG. 3 illustrates a second dispatch data structure.

FIG. 3 illustrates a different a dispatch data structure 300 within a holder structure 301. The holder structure 301 includes the m-table 203 having the i-table index element 204, and the i-table 207. As in FIG. 2, the i-table 207 is dense packed with one or more holder addressor region(s) such as by a first holder addressor region 309 and a second holder addressor region 311 through $m^{th}$ holder addressor region (not shown). Each of the holder addressor regions starts with a holder identification number element 313. The holder identification number element 313 is followed by the first member addressor element 215 through the $n^{th}$ member addressor element 217 as previously described with respect to FIG. 2.

Access to the i-table 207 is accomplished by calculating the hash of the identification number for the relevant supermember holder (T), indexing into the i-table 207 using the corresponding "ITBL IDX-D" from the i-table index element 204 of the m-table 203, and verifying that the "STP SN-D" value in the holder identification number element 313 of the holder addressor region matches the identification number of T. Once the fast subtype test process has been succeeded, an member of T can be accessed using the first member addressor element 215 through the $n^{th}$ member addressor element 217 as previously described.

For the version of the technology shown in FIG. 3 where the identification number of each supermember holder (T), used by the holder is stored in a element in the holder addressor region of the i-table index element 204, a fast subtype test process (testing whether (T) is a supermember holder of holder C) can be defined as:

m-index:=id_num(T) % m-table-size(C)
i-base:=m-table[m-index]
answer_state:=i-table[i-base]==id_num(T)

as is subsequently described with respect to FIG. 6.

Figure 4:
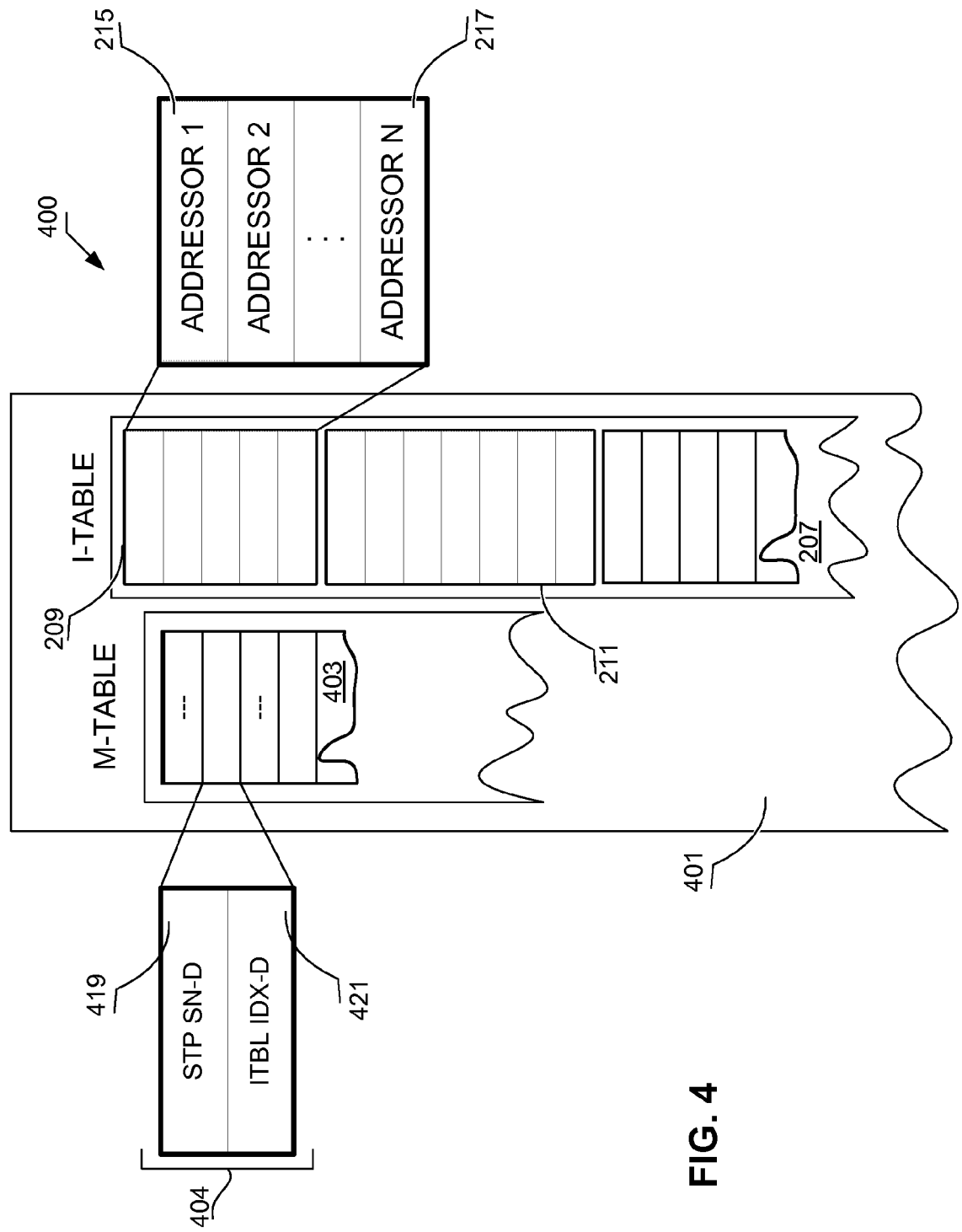
FIG. 4 illustrates a third dispatch data structure.

FIG. 4 illustrates a dispatch data structure 400 that is a variant of that described with respect to FIG. 2 and FIG. 3 where a holder structure 401 contains an m-table 403 with elements having a slot structure 404.

As in FIG. 2, the i-table 207 is densely packed with one or more holder addressor region(s) such as the first holder addressor region 209 and the second holder addressor region 211 through m$^{th}$ holder addressor region (not shown). Each of the holder addressor regions has the first member addressor element 215 through the n$^{th}$ member addressor element 217 respectively as described with respect to FIG. 2.

The slot structure 404 includes a holder identification number element 419 that is used as described with respect to the holder identification number element 206 and an i-table index element 421 containing an i-table index used as described with respect to the i-table index element 204, both with respect to FIG. 2.

One skilled in the art will understand that other equivalent structures exist for the structures described with respect to FIG. 2, FIG. 3 and FIG. 4.

Figure 5:
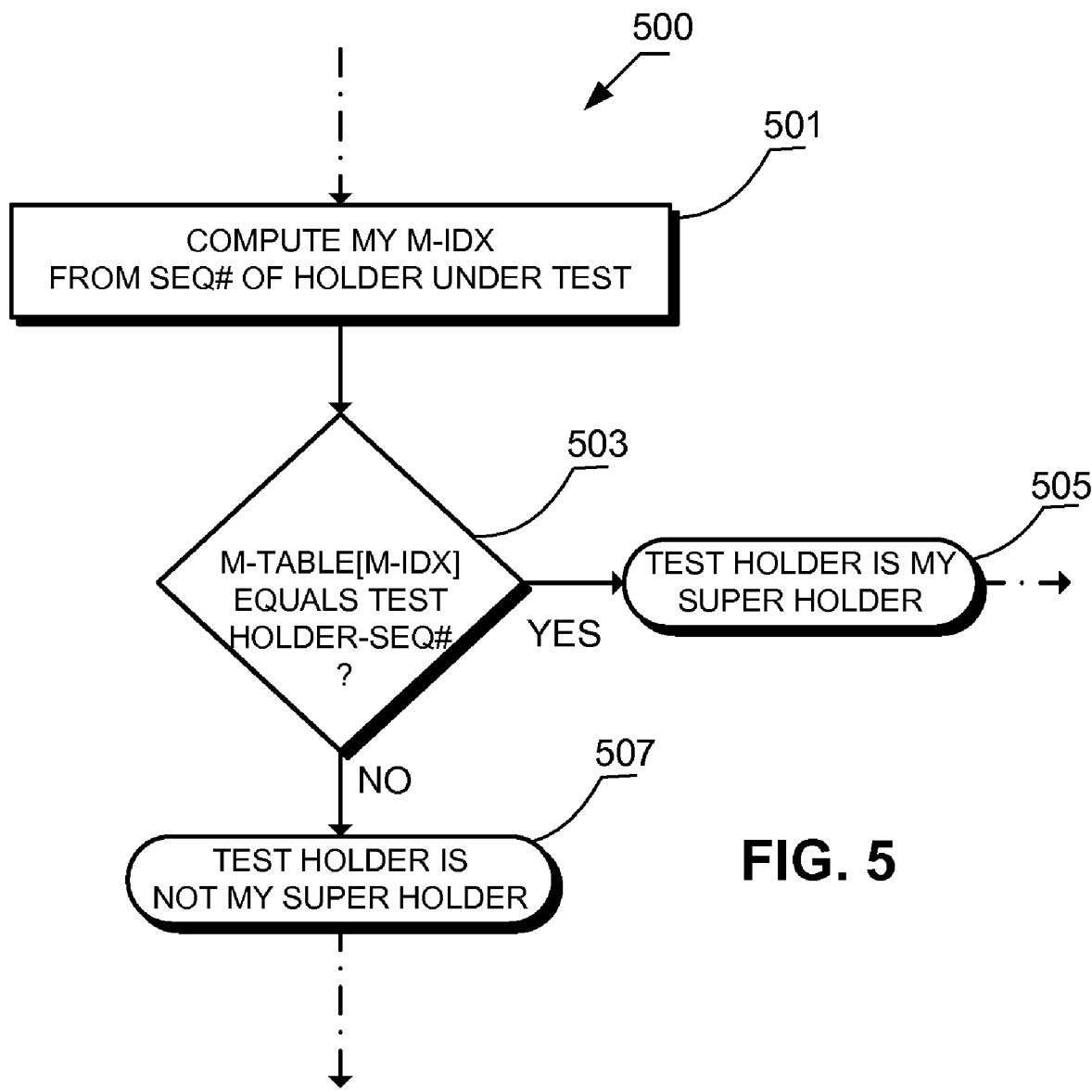
FIG. 5 illustrates a first subtype test process.

Looking closer at the previously described processes, FIG. 5 illustrates the first subtype test process 500 for performing a fast subtype test process using the structures shown in FIG. 2 and FIG. 4. A first subtype test process 500 performs a 'compute m-index' procedure 501 that hashes the identification number of the supermember holder into the second m-table 205 (or finds the element index into the m-table 403) and then a 'test holder sequence number' decision procedure 503 determines whether identification number of the holder being tested has the same value as the value held by the hashed-to element in the second m-table 205 (or the first entry in the hashed-to element into the m-table 403—the holder identification number element 419). If the values match then a 'super-holder' state 505 is established. If the values do not match, a 'not super-holder' state 507 is established.

Figure 6:
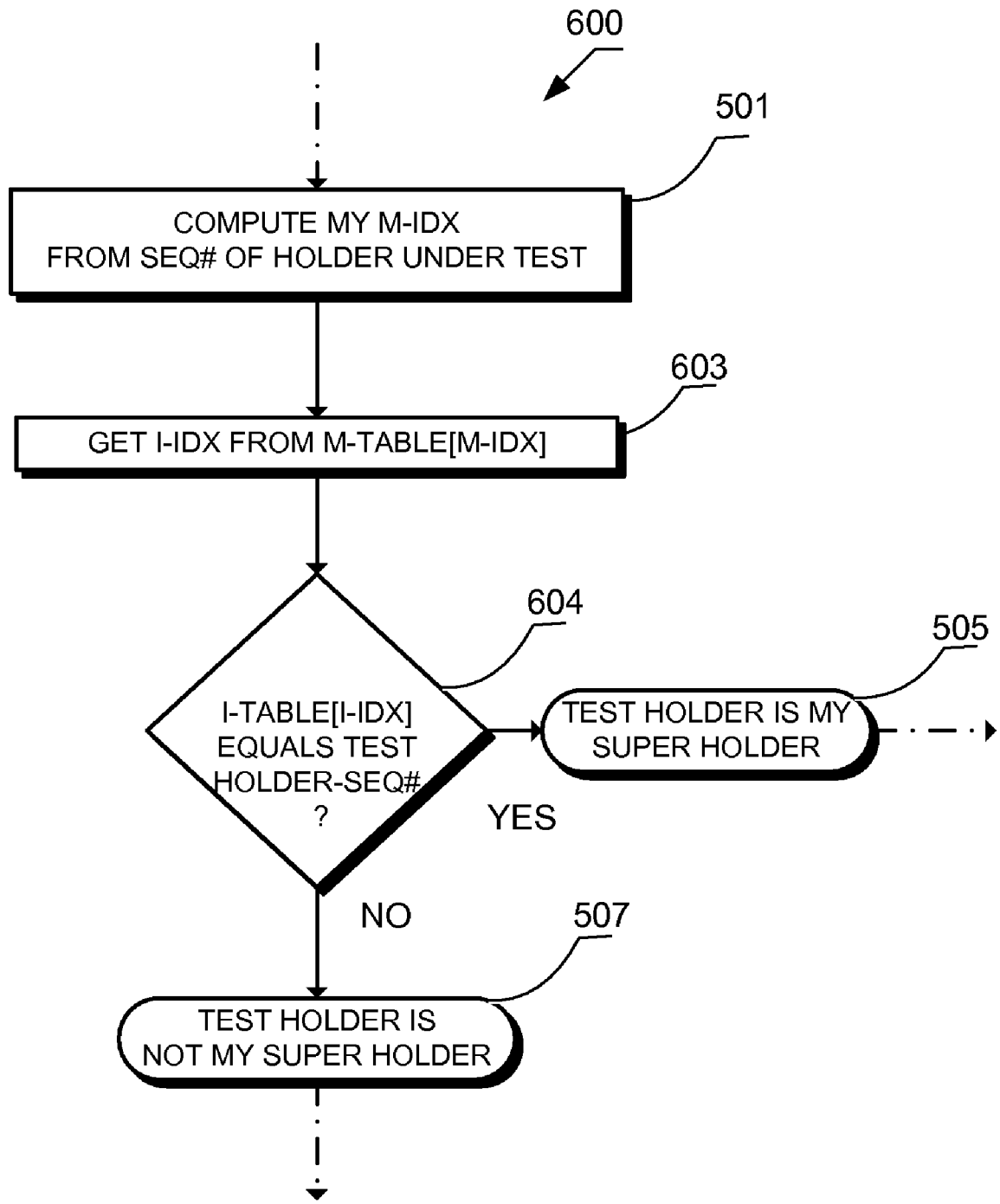
FIG. 6 illustrates a second subtype test process.

FIG. 6 illustrates a second subtype test process 600 for performing a fast subtype test process using the dispatch data structure 300 of FIG. 3 The second subtype test process 600 performs the 'compute m-index' procedure 501 that hashes the identification number of the holder into the m-table 203 as previously described. Then a 'get i-table index' procedure 603 retrieves the i-table index element 204 from the m-table 203 (of FIG. 3) and uses that index to locate the holder's addressor structure within the i-table 207. Next a 'test holder sequence number' decision procedure 604 determines whether identification number of the holder under test is the same as the identification number contained in the holder identification number element 313 of the dispatch data structure 300. If so, then the 'super-holder' state 505 is established. If not, the 'not super-holder' state 507 is established.

Figure 7:
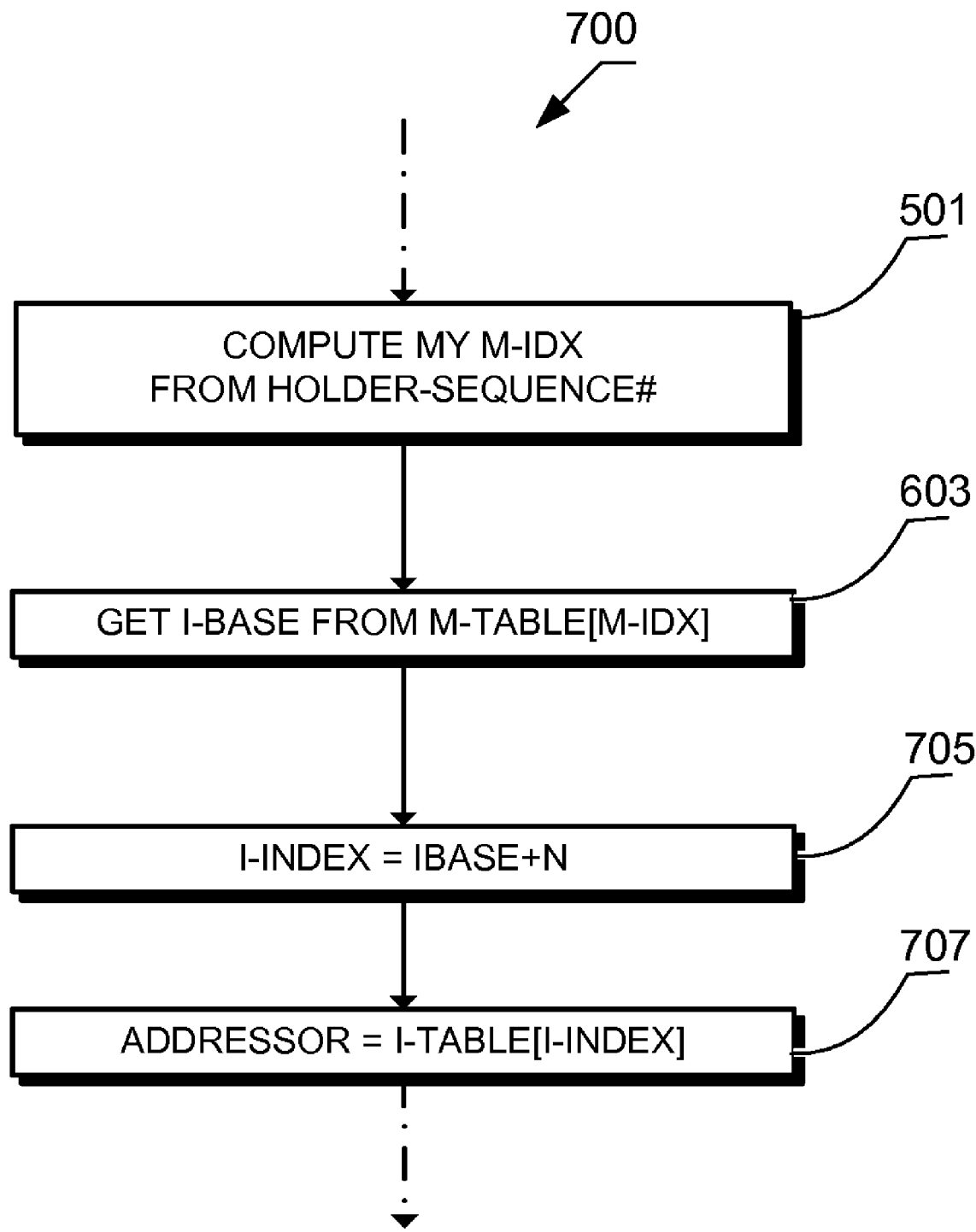
FIG. 7 illustrates a method selection process.

FIG. 7 illustrates a member selection process 700 that can be used to determine which member to invoke from within a supermember holder of the holder. The 'compute m-index' procedure 501 computes the modulo of the identification number for the holder with respect to the m-table size, such that the 'get i-table index' procedure 603 can index into the m-table to get the offset into the i-table for the holder addressor region of the supermember holder. Next, a 'compute i-index for nth entry' procedure 705 computes the index into the i-table for the addressor to the member and a 'get addressor' procedure 707 obtains the addressor. Once the addressor is determined the member is disambiguated and that member can be accessed or be a target of message. The 'compute i-index for nth entry' procedure 705 can be the same for FIG. 2, FIG. 3, and FIG. 4 where, for FIG. 3 the offsets to the addressors from ITBL IDX have been appropriately adjusted to account for the holder identification number element 313

One skilled in the art will understand how to accommodate the above description for versions of the disclosed technology where the holder addressor region stores the holder identification number element 313. Such a one would also understand from the above descriptions how to implement the programmed-processes shown in FIG. 6, FIG. 5, and FIG. 7 for use with the dispatch data structure 400.

The technology disclosed herein implements the following queries in Object-Oriented programming languages with multiple inheritance: 1) dynamic interface inheritance testing given multiple interface inheritance and 2) dynamic mixin subholder testing given multiple implementation inheritance; 3) interface method invocation selection dispatch given multiple interface inheritance and 4) method invocation selection dispatch given multiple implementation inheritance.

One skilled in the art will understand that figure element labels have remained the same where a component in a subsequent figure has been described with relation to a prior figure and that the component has no significant change in structure or function in the subsequent figure from the prior figure.

These techniques disclosed herein have minimal numbers of load operations and no branches. To mitigate the overhead of the modulo operation some embodiments implement it using a well-known technique that uses integer multiplication. For example, instead of dividing by m-table-size, multiply by its reciprocal (the fixed-point real number in integer representation with 2k+1 bits where k is the maximum number of identification numbers that can be handed out), then multiply the result by m-table-size and subtract one product from the other to produce the remainder.

As used herein, a procedure is a self-consistent sequence of steps that can be performed by logic implemented by a programmed computer, specialized electronics or other circuitry or a combination thereof that lead to a desired result. These steps can be defined by one or more computer instructions. These steps can be performed by a computer executing the instructions that define the steps. Further, these steps can be performed by circuitry designed to perform the steps. Thus, the term "procedure" can refer (for example, but without limitation) to a sequence of instructions, a sequence of instructions organized within a programmed-procedure or programmed-function, a sequence of instructions organized within programmed-processes executing in one or more computers, or a sequence of steps performed by electronic or other circuitry, or any logic or combination of the foregoing. In particular, the methods and processes described herein can be implemented with logics such as, for example but without limitation, a collection logic, various construction logics, a determination logic, a dispatch logic, an inheritance determination logic, a locator logic, etc.

One skilled in the art will understand that the network carries information (such as informational data as well as data that defines a computer program). The information can also be propagated using a carrier-wave. Signals capable of propagating the information includes electromagnetic signals, visible or invisible light pulses, signals on a data bus, or signals propagated over any wire, wireless, or optical fiber technology that allows information to be transmitted over a network. Programs and data are commonly read from both tangible physical media (such as a compact, floppy, or magnetic disk) and from a network. Thus, the network, like a tangible physical media, is a computer-usable data carrier.

One skilled in the art will understand that the technology disclosed herein teaches the construction and use of OOP holder dispatch structures. Such a one will also understand the implementation advantages of using this technology.

From the foregoing, it will be appreciated that the technology has (without limitation) the following advantages:

1) The technology can be quickly implemented.
2) The technology results in a performance/memory usage trade-off that is acceptable for general applications.
3) The technology has few if any pathological memory/performance behaviors.
4) The technology provides predictable performance. Thus it can be used for real-time situations.
5) The technology allows dispatch to be in the low 10 s of cycles (11-46 depending on the processor) and can be optimized to be 8-16).

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed follows:

1. A computer controlled method configured to construct a dispatch data structure for a holder, said method comprising:
    determining a set of member holders from which said holder inherits, one of said set of member holders having a respective set of members, each of said set of member holders uniquely identified by an identification number respectively;
    constructing an i-table containing one or more holder addressor regions, one of said one or more holder addressor regions containing addressors for said respective set of members, each of said one or more holder addressor regions associated with a respective i-table index;
    collecting a respective set of identification numbers for said set of member holders, wherein each of said one or more holder addressor regions further comprises one of said respective set of identification numbers associated with said respective i-table index;
    constructing an m-table, said m-table having an m-table size, said m-table size selected to perfectly hash said respective set of identification numbers by said m-table size, wherein constructing the perfectly-hashed m-table involves constructing a hash table for which there are no collisions between hashed values, wherein constructing the m-table comprises:
        determining an initial m-table size;
        hashing each of the identification numbers in the set of identification numbers by the m-table size to generate a set of corresponding hashed values;
        detecting if two or more of the hashed values are to be placed in a same location in the m-table, resulting in a collision in the m-table between the hashed values; and
        if so, increasing the size of the m-table and performing the hashing and detecting operations until a size is encountered for which the m-table can be perfectly-hashed; and
    populating said m-table with said respective i-table index for each of said set of member holders, by computing an m-table index responsive to each of said respective set of identification numbers modulo said m-table size and storing said respective i-table index in said m-table respective to said m-table index.

2. The computer controlled method of claim 1, further comprising constructing a second m-table having said m-table size; and wherein populating said m-table further comprises storing said each of said respective set of identification numbers in said second m-table respective to said m-table index.

3. The computer controlled method of claim 1, wherein one element of said m-table is capable of storing said respective i-table index and said identification number.

4. A computer controlled method, to utilize a dispatch data structure for a holder, said dispatch data structure including an m-table and an i-table, said m-table having an m-table size, said i-table containing one or more holder addressor regions, said method comprising:
    determining an m-table index into said m-table by accessing an identification number of a holder of interest and computing said identification number modulo said m-table size, wherein a size of said m-table is configured such that each of the hashed values generated by hashing each of the identification numbers by the m-table size can be placed in a location in the m-table without colliding with another of the hashed values, wherein said dispatch data structure also comprises a second m-table having said m-table size, said second m-table containing one or more identification numbers, said method further comprising determining whether the contents of said second m-table respective to said m-table index is equal to said identification number;
    accessing an i-table index from said m-table responsive to said m-table index, said i-table index locating one of said one or more holder addressor regions in said i-table; and
    dispatching relative to said one of said one or more holder addressor regions.

5. The computer controlled method of claim 4, wherein said one or more holder addressor regions also includes a holder identification number associated with said i-table index said method further comprising determining whether said holder identification number is equal to said identification number.

6. The computer controlled method of claim 4, wherein said m-table contains an element comprising said i-table index and a holder identification number, the method further comprising determining whether said holder identification number is equal to said identification number.

7. An apparatus having a central processing unit (CPU) and a memory coupled to said CPU, the apparatus configured to construct a dispatch data structure in said memory for a holder, wherein said apparatus comprises:
    an inheritance determination logic configured to determine a set of member holders from which said holder inherits, one of said set of member holders having a respective set of members, each of said set of member holders uniquely identified by an identification number respectively;
a first construction logic configured to construct an i-table responsive to the inheritance determination logic, said i-table containing one or more holder addressor regions, one of said one or more holder addressor regions containing addressors for said respective set of members, each of said one or more holder addressor regions associated with a respective i-table index;
a collection logic configured to collect a respective set of identification numbers for said set of member holders and responsive to the inheritance determination logic, wherein each of said one or more holder addressor regions further comprises one of said respective set of identification numbers associated with said respective i-table index; and
a second construction logic, responsive to the collection logic, configured to construct an m-table, said m-table having an m-table size, said m-table size selected to perfectly hash said respective set of identification numbers by said m-table size and to populate said m-table with said respective i-table index for each of said set of member holders by computing an m-table index responsive to each of said respective set of identification numbers modulo said m-table size and storing said respective i-table index in said m-table respective to said m-table index, wherein when constructing said m-table, the second construction logic is configured to construct a hash table for which there are no collisions between hashed values, wherein constructing the m-table comprises:
determining an initial m-table size;
hashing each of the identification numbers in the set of identification numbers by the m-table size to generate a set of corresponding hashed values;
detecting if two or more of the hashed values are to be placed in a same location in the m-table, resulting in a collision in the m-table between the hashed values; and
if so, increasing the size of the m-table and performing the hashing and detecting operations until a size is encountered for which the m-table can be perfectly-hashed.

8. The apparatus of claim 7, further comprising a third constructing logic configured to construct a second m-table having said m-table size; and wherein the second construction logic is further configured to populate said m-table with said each of said respective set of identification numbers in said second m-table respective to said m-table index.

9. The apparatus of claim 7, wherein one element of said m-table is capable of storing said respective i-table index and said identification number.

10. An apparatus having a central processing unit (CPU) and a memory coupled to said CPU, to utilize a dispatch data structure for a holder in said memory, said dispatch data structure including an m-table and an i-table, said m-table having an m-table size, said i-table containing one or more holder addressor regions, wherein said apparatus comprises:
a determination logic configured to determine an m-table index into said m-table, the determination logic configured to perform a modulo operation on an identification number of a holder of interest by said m-table size, wherein a size of said m-table is configured such that each of the hashed values generated by hashing each of the identification numbers by the m-table size can be placed in a location in the m-table without colliding with another of the hashed values, wherein said dispatch data structure also comprises a second m-table having said m-table size, said second m-table containing one or more identification numbers, said method further comprising determining whether the contents of said second m-table respective to said m-table index is equal to said identification number;
a locator logic, responsive to the determination logic, configured to access an i-table index from said m-table responsive to said m-table index, said i-table index configured to locate one of said one or more holder addressor regions in said i-table; and
a dispatch logic, responsive to the locator logic, configured to dispatch relative to said one of said one or more holder addressor regions.

11. The apparatus of claim 10, wherein said one or more holder addressor regions also includes a holder identification number associated with said i-table index, said apparatus further comprising a second determination logic configured to determine whether said holder identification number is equal to said identification number.

12. The apparatus of claim 10, wherein said m-table contains an element comprising said i-table index and a holder identification number, the apparatus further comprising a second determination logic configured to determine whether said holder identification number is equal to said identification number.

13. A computer program product for constructing a dispatch data structure for a holder comprising a computer-usable data carrier providing instructions that, when executed by a computer, cause said computer to perform a method comprising:
determining a set of member holders from which said holder inherits, one of said set of member holders having a respective set of members, each of said set of member holders uniquely identified by an identification number respectively;
constructing an i-table containing one or more holder addressor regions, one of said one or more holder addressor regions containing addressors for said respective set of members, each of said one or more holder addressor regions associated with a respective i-table index;
collecting a respective set of identification numbers for said set of member holders, wherein each of said one or more holder addressor regions further comprises one of said respective set of identification numbers associated with said respective i-table index;
constructing an m-table, said m-table having an m-table size, said m-table size selected to perfectly hash said respective set of identification numbers by said m-table size, wherein constructing the perfectly-hashed m-table involves constructing a hash table for which there are no collisions between hashed values, wherein constructing the m-table comprises:
determining an initial m-table size;
hashing each of the identification numbers in the set of identification numbers by the m-table size to generate a set of corresponding hashed values;
detecting if two or more of the hashed values are to be placed in a same location in the m-table, resulting in a collision in the m-table between the hashed values; and
if so, increasing the size of the m-table and performing the hashing and detecting operations until a size is encountered for which the m-table can be perfectly-hashed; and populating said m-table with said respective i-table index for each of said set of member holders, by computing an m-table index responsive to each of said respective set of identification numbers modulo said m-table size and storing said respective i-table index in said m-table respective to said m-table index.

14. The computer program product of claim 13, further comprising constructing a second m-table having said m-table size; and wherein populating said m-table further comprises storing said each of said respective set of identification numbers in said second m-table respective to said m-table index.

15. The computer program product of claim 13, wherein one element of said m-table is capable of storing said respective i-table index and said identification number.

16. The computer program product of claim 13, further comprising utilizing said dispatch data structure for said holder.

17. A computer program product for utilizing a dispatch data structure for a holder, said dispatch data structure including an m-table and an i-table, said m-table having an m-table size, said i-table containing one or more holder addressor regions, comprising a computer-usable data carrier providing instructions that, when executed by a computer, cause said computer to perform a method comprising:
   determining said m-table index into said m-table by accessing an identification number of a holder of interest and computing said identification number modulo said m-table size, wherein a size of said m-table is configured such that each of the hashed values generated by hashing each of the identification numbers by the m-table size can be placed in a location in the m-table without colliding with another of the hashed values, wherein said dispatch data structure also comprises a second m-table having said m-table size, said second m-table containing one or more identification numbers, said method further comprising determining whether the contents of said second m-table respective to said m-table index is equal to said identification number;
   accessing said i-table index from said m-table responsive to said m-table index, said i-table index locating one of said one or more holder addressor regions in said i-table; and
   dispatching relative to said one of said one or more holder addressor regions.

18. The computer program product of claim 16, wherein said one or more holder addressor regions also includes a holder identification number associated with said i-table index said method further comprising determining whether said holder identification number is equal to said identification number.

19. The computer program product of claim 16, wherein said m-table contains an element comprising said i-table index and a holder identification number, the method further comprising determining whether said holder identification number is equal to said identification number.

* * * * *